No. 867,396. PATENTED OCT. 1, 1907.
A. MÜLLER & J. KLEIN.
PANORAMA CAMERA.
APPLICATION FILED JUNE 5, 1906.
2 SHEETS—SHEET 1.
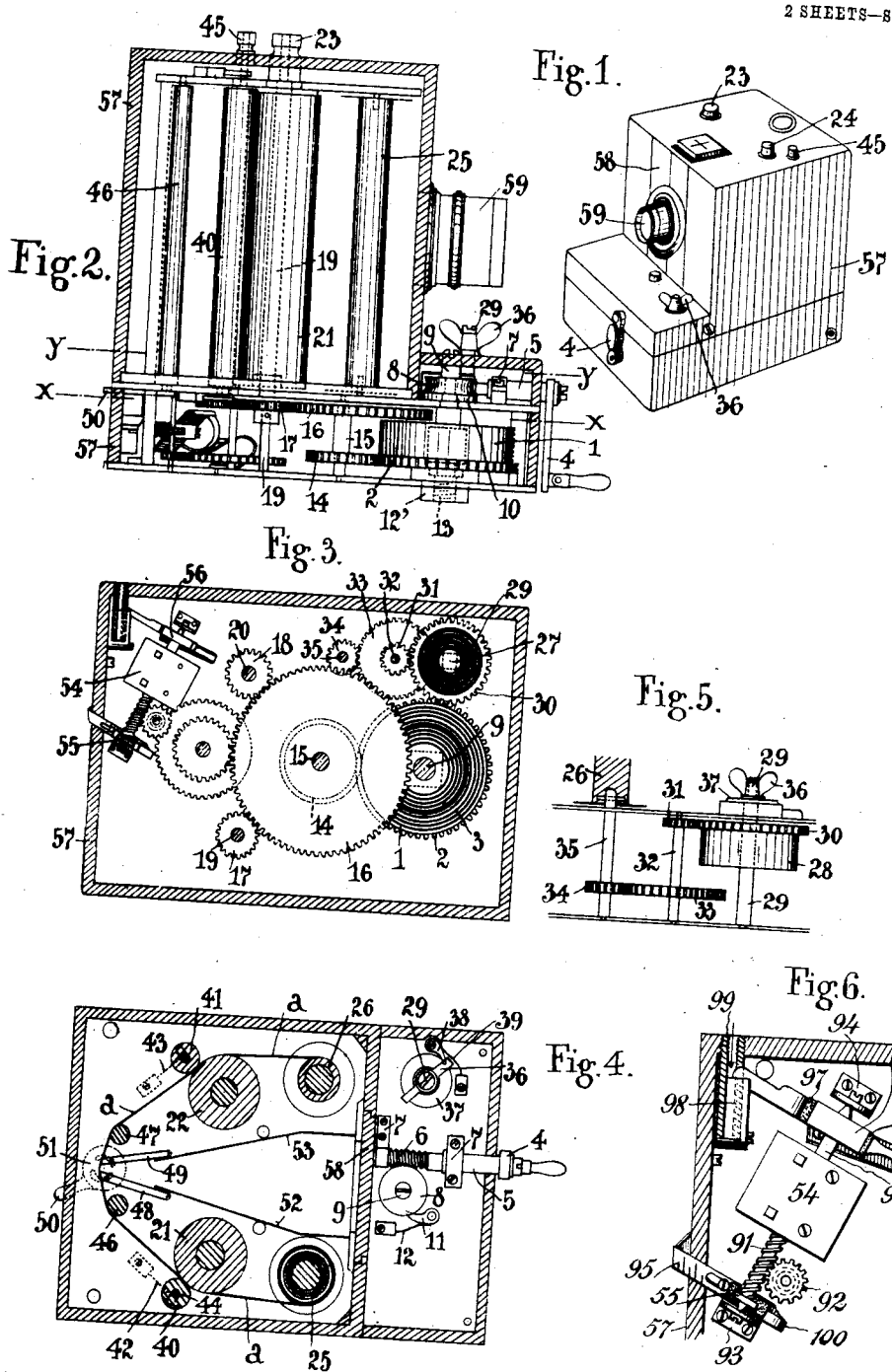
WITNESSES:
A. Donnelly
A. H. Berrigan
INVENTORS;
AUGUST MÜLLER AND
JOHANN KLEIN,
BY H. Van Orsdenmul
ATTORNEY.

No. 867,396.

PATENTED OCT. 1, 1907.

A. MÜLLER & J. KLEIN.
PANORAMA CAMERA.
APPLICATION FILED JUNE 5, 1906.

2 SHEETS—SHEET 2.

WITNESSES:
W. A. Berrigan.
F. H. Logan.

INVENTORS,
AUGUST MÜLLER and JOHANN KLEIN,
BY
Attorney.

UNITED STATES PATENT OFFICE.

AUGUST MÜLLER AND JOHANN KLEIN, OF RHÖNDORF-ON-THE-RHINE, GERMANY.

PANORAMA-CAMERA.

No. 867,396.

Specification of Letters Patent.

Patented Oct. 1, 1907.

Application filed June 5, 1906. Serial No. 320,242.

*To all whom it may concern:*

Be it known that we, AUGUST MÜLLER and JOHANN KLEIN, manufacturers, both subjects of the German Emperor, residing both at Rhöndorf-on-the-Rhine, Germany, have invented new and useful Improvements in Panorama-Cameras; and we do hereby declare the following to be a full, clear, and exact description of the same.

Our present invention relates to panorama-cameras. In the devices of this kind, the motive power acts generally on the shaft of the spool designed to receive the sensitive material, or it is caused to actuate the rotation shaft of the camera. In the first named construction the speed of revolution of the camera and therefore the lighting of the sensitive layer are irregular, while in the second named construction the lighted material is not wound up in a regular way, whereby disturbances may happen particularly when long films are used.

The object of this present invention is to provide a camera, wherein these two actuating means are combined, so that the main motive power acts on the camera, while the other power actuates the spool upon which the sensitive material is wound, thereby obtaining a regular and uniform movement of the camera and a uniform displacement of the sensitive material at the lighted place.

Figure 7:
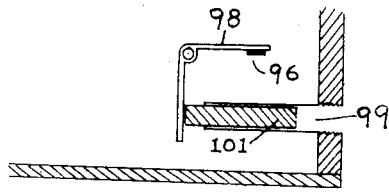
Figure 8:
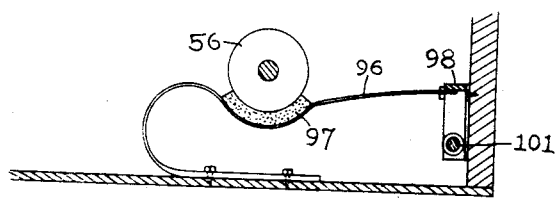
Figure 9:
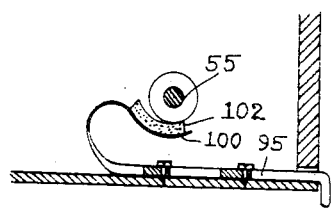

In the accompanying drawings:—Figure 1 shows a perspective view of the closed camera, Fig. 2 is a vertical longitudinal section through the same, Fig. 3 shows a horizontal section on line x—x of Fig. 2, Fig. 4 is a horizontal section on line y—y of Fig. 2, Fig. 5 shows an enlarged detail view of the receiving spool actuating mechanism, and Fig. 6 is an enlarged detail view of the device for regulating the speed of the camera. Figs. 7 and 8 illustrate details of the device for pneumatically controlling the speed of the camera. Fig. 9 illustrates details of the means for manually applying the brake to the camera-driving means.

Referring to the drawings, 1 represents a drum or case provided with a toothed rim 2 and containing a drive-spring 3, serving to rotate the camera. Said spring is wound up by means of a suitable handle-crank 4, secured to a horizontal shaft 5, journaled in bearings 7 and provided with a worm 6, meshing with a worm-wheel 8 fast on the shaft 9 of the drum 1. Said worm-wheel is made integral with a ratchet wheel 10, engaged by a pawl 11, actuated by a suitable spring 12 to prevent the spring from rotating the wheel 8, worm-shaft 5 and handle 4 backwardly. The shaft worm-shaft 5 and handle 4 backwardly. The shaft 9 of the drum 1 is situated exactly below the optic center line of the objective, and journaled at its lower end in a stationary pivot 12' provided with a screw-threaded recess 13, permitting of securing the camera on a tripod or attaching a handle thereto. The motive power of the spring 3 produces also the feeding of the film *a*, as the toothed rim 2 of the drum 1 meshes with a gear-wheel 14, fast on shaft 15, carrying a larger gear-wheel 16, which in turn meshes with toothed pinions 17, 18, fast on the shafts 19, 20 respectively, to which are secured in a well-known manner the feed-rollers 21, 22 respectively. Said rollers 21, 22 are provided with knobs 23, 24 whereby they may be loosened on their shafts and rotated independently and freely, in order to facilitate the preparation of the camera for making a photographic picture. For the operation proper, the rollers 21, 22 must be firmly secured on their respective shafts by tightening said knobs 23, 24.

The sensitive band is inserted into the apparatus in the form of a roll or spool 25, and during the operation it is wound upon the roller or spool 26. In order to secure a good operation in this respect, said spool 26 is actuated independently by means of a spring 27, contained in a case or drum 28 arranged on a shaft 29 and provided with a toothed rim 30, meshing with a gear-wheel 31, fast on a shaft 32, carrying another gear-wheel 33, which in turn meshes with the gear-wheel 34 fast on the shaft 35 of said spool 26. Said spring 27 serves therefore to wind up the film *a*, and by pulling on the latter assists the spring 3 in rotating the camera itself. The spring 27 is wound up by means of a winged-nut 36, combined in a well-known manner with a ratchet-wheel 37, pawl 38 and spring 39 for the well-known purpose.

The feed-rollers 21, 22 are combined with rollers 40, 41 held by means of springs 42, 43 respectively in proper operative position, and serving to prevent the sensitive film from slacking. The shaft 44 of the pressure roller 40 projects upwardly above the wall of the camera case, and is provided with a milled knob 45 for the purpose of feeding the film as desired after loosening the knobs 23, 24.

46, 47 represent guide-rollers for moving the film *a* through the lighted place. The small partitions 48, 49 pivoted at one end, may be adjusted in a well-known manner by means of the lever 50 and slotted disk-plate 51, in order to adjust the lighted strip of the film in accordance with the intensity of the light. In order to facilitate this adjustment, the lever 50 moves on a suitable scale at the back of the camera-case. 52, 53 represent partitions serving to separate the inner room from the spool containing place of the camera.

The feed spool 25 is loose on its shaft or pivot-pin, while the winding-spool 26 is coupled with the shaft 35 and rotated by the spring 27.

The speed of the camera is controlled by any suitable means, and I have shown, for this purpose, the wheel 92 (Fig. 6), which engages a worm 91 carrying a blade 54. The shaft 90 of said blade rests in bearings 93, 94 and carries two disks 55, 56. Under the disk 56 (see Fig. 8) on the bottom of the camera a spring 96 with a brake shoe 97 is arranged. Upon the exterior end of this spring acts an arm of a movable lever 98, the other arm of which rests against a bolt or plunger 101 in an air passage 99. Upon pressing in air, by means of a pump or ball through the pipe 99, the bolt 101 strikes (see Fig. 7) against the angle lever 98, the latter presses on the spring 96 and releases the brake shoe 97, and when the pressure upon the lever ceases, the spring 96, lever 98, and bolt 101, return to starting position and the brake shoe comes to rest again against the disk 56 so that the camera is held fast in its revolution. Upon the disk 55 acts a brake spring 100 (see also Fig. 9), the pressure of which can be varied by means of a slide 95 or the like, bringing more or less of the felt 102 against the disk 55, so as to regulate the rotary speed of the camera. The slide 95 is provided with a scale, in accordance with which the desired rotary speed of the camera can be adjusted.

The entire mechanism, and also the well-known controller 54, brake 55, and pneumatically operated stop device 56, spools and feed-rollers are housed within a casing 57 provided at the front wall with an adjustable section 58, carrying the objective 59.

Having fully described our invention, what we claim and desire to secure by Letters Patent is:—

1. In a panorama-camera of the kind described, the combination of a main motive-spring and a second motive-spring, an independent rotatable case for each spring, means whereby the main spring revolves the camera, a film-spool, a film receiving-spool, and means whereby the second spring rotates the latter, substantially as set forth.

2. In a panorama-camera of the kind described, the combination with the rotatable shaft of the camera, and the film feeding and receiving spools, of a main spring, and a case therefor suitably coupled with the shaft of the camera, a pair of feed-rollers, and suitable connections between said rollers and the spring case, a second spring and the case therefor, suitably coupled with the shaft of the film receiving spool, substantially as set forth.

In testimony whereof, we have signed our name to this specification in the presence of two subscribing witnesses.

AUGUST MÜLLER.
JOHANN KLEIN.

Witnesses:
LOUIS VANDORN,
ROSSITER KANTZ.